(12) United States Patent
Goebel et al.

(10) Patent No.: US 9,705,139 B2
(45) Date of Patent: Jul. 11, 2017

(54) PRINTED MULTI-FUNCTION SEALS FOR FUEL CELLS

(71) Applicant: GM GLOBAL TECHNOLOGY OPERATIONS LLC, Detroit, MI (US)

(72) Inventors: Steven G. Goebel, Victor, NY (US); Jeffrey A. Rock, Rochester Hills, MI (US); Anita Luong, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 432 days.

(21) Appl. No.: 14/446,834

(22) Filed: Jul. 30, 2014

(65) Prior Publication Data

US 2016/0036068 A1 Feb. 4, 2016

(51) Int. Cl.
| | | |
|---|---|---|
| *H01M 8/02* | (2016.01) | |
| *H01M 8/0286* | (2016.01) | |
| *H01M 8/0258* | (2016.01) | |
| *H01M 8/0276* | (2016.01) | |
| *H01M 8/0284* | (2016.01) | |
| *H01M 8/2483* | (2016.01) | |
| H01M 8/1018 | (2016.01) | |

(52) U.S. Cl.
CPC ....... *H01M 8/0286* (2013.01); *H01M 8/0258* (2013.01); *H01M 8/0276* (2013.01); *H01M 8/0284* (2013.01); *H01M 8/2483* (2016.02); H01M 2008/1095 (2013.01)

(58) Field of Classification Search
CPC .................................................. H01M 8/0286
See application file for complete search history.

(56) References Cited

U.S. PATENT DOCUMENTS

| | | | |
|---|---|---|---|
| 7,344,794 B2 | 3/2008 | Tanaka et al. | |
| 2002/0119358 A1* | 8/2002 | Rock ................... | H01M 8/0228 429/434 |
| 2002/0192529 A1* | 12/2002 | Nakamura ........... | C09D 121/00 429/535 |
| 2006/0090330 A1* | 5/2006 | Kauranen ........... | H01M 8/0213 29/623.4 |

* cited by examiner

*Primary Examiner* — Jonathan Crepeau
(74) *Attorney, Agent, or Firm* — Brooks Kushman P.C.

(57) ABSTRACT

A method for forming seals in a fuel cell stack includes a step of screen printing a first sealing layer on a first flow field plate. The first sealing layer defines a first pattern and has a first predetermined sealing layer thickness. A multilayer seal is formed by screen printing a second sealing layer over the first sealing layer. The second sealing layer defines a second pattern and has a second predetermined sealing layer thickness. A third sealing layer is screen printed over a first side of a second flow field plate and has a third predetermined sealing layer thickness. A fourth sealing layer is screen printed over a second side of the second flow field plate having a fourth predetermined sealing layer thickness. The first flow field plate and the second flow field plate are combined to form flow channels for guiding reactants a fuel cell catalyst layers.

19 Claims, 11 Drawing Sheets

PRINTED MULTI-FUNCTION SEALS FOR FUEL CELLS

TECHNICAL FIELD

The present invention is related to sealing structures for fuel cells and fuel cell stacks.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode catalyst layers of a typical PEM fuel cell are typically thin films formed by dried inks. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of electrically conductive porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells arranged in stacks in order to provide high levels of electrical power. Although the catalyst layers used in fuel cells work reasonably well, such layers tend to be expensive.

To reduce the cost of fuel cells, it is desired to reduce the number of parts and manufacturing processes. Each cell requires a seal for each reactant and coolant as well as tunnels (openings past the seal) to allow reactants and coolant to pass to and from their respective headers. The sealing is typically accomplished with a molded elastomeric seal for the reactants and welding of stamped metal plates to seal coolant. The tunnel features are typically part of the plate, but with stamped plates, this also puts these features on the other side of the plate which is not always desirable. One issue with molded seals is the cost of mold cavities and long cure times which lead to an expensive part. Cure-in-place seal materials can be dispensed onto the plate or sub-gasket, but this process is slow. The dispensed seal also presents challenges at knit lines and intersections to maintain a consistent seal thickness especially for the small repeat distances desired for automotive fuel cells. The plate welding process, including fixturing the two plate halves together, can be slow and costly. The need to weld plate halves together can also limit plate metal and coating choices.

Accordingly, there is a need for improved methods for forming seals that are applicable to fuel cells and fuel cell stacks.

SUMMARY

The present invention solves one or more problems of the prior art by providing, in at least one embodiment, a method for forming a seal in a fuel cell and/or fuel cell stack. The method includes a step in which a first sealing layer is screen printed on a first flow field plate. The first sealing layer defines a first pattern and has a first predetermined sealing layer thickness. A multilayer seal is formed by screen printing a second sealing layer over the first sealing layer. The second sealing layer defines a second pattern and has a second predetermined sealing layer thickness. A third sealing layer is screen printed over a first side of a second flow field plate and has a third predetermined sealing layer thickness. A fourth sealing layer is screen printed over a second side of the second flow field plate having a fourth predetermined sealing layer thickness. The first flow field plate and the second flow field plate are combined to form flow channels for guiding reactants to fuel cell catalyst layers. Characteristically, one of the first flow field plate and the second flow field plate is an anode flow field plate and one of the first flow field plate and the second flow field plate is a cathode flow field plate.

In another embodiment, a method for forming a multilayer seal for fuel cell sealing is provided. The method includes a step of providing a first screen having a first resinous masking material disposed thereon in a first pattern, the first resinous masking material blocking flow through the first screen. The first resinous masking material extends a first predetermined masking layer thickness from the first screen. The method also includes a step of providing a second screen having a second resinous masking material disposed thereon in a second pattern. The second pattern resinous masking material blocks flow through the second screen. The second resinous masking material extends a second predetermined masking layer thickness from the second screen. The first screen is positioned proximate to a first side of a first flow field plate. A first curable seal composition is applied to the first screen such that the first curable seal composition flows through the screen at locations not blocked by the first resinous masking material and onto the first flow field plate. The first curable seal composition is at least partially cured to form a first sealing layer. The first sealing layer defines a first seal pattern. The second screen is positioned proximate to the first sealing layer. A second curable seal composition is applied to the second screen such that the second curable seal composition flows through the second screen at locations not blocked by the second resinous masking material and onto the first sealing layer. A screen printed multilayer seal is formed by at least partially curing the second curable seal composition to form a second sealing layer. The multilayer seal includes the first sealing layer and the second sealing layer with the second sealing layer defining a second seal pattern that overlays at least a portion of the first sealing layer. A second flow field plate has a third sealing layer disposed on a first side of the second flow field plate and a fourth sealing layer disposed on a second side of the second flow field plate. The first flow field plate and the second flow field plate are combined to form flow channels for guiding reactants to fuel cell catalyst layers. Characteristically, one of the first flow field plate and the second flow field plate is an anode flow field plate and one of the first flow field plate and the second flow field plate is a cathode flow field plate.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; molecular weights provided for any polymers refer to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
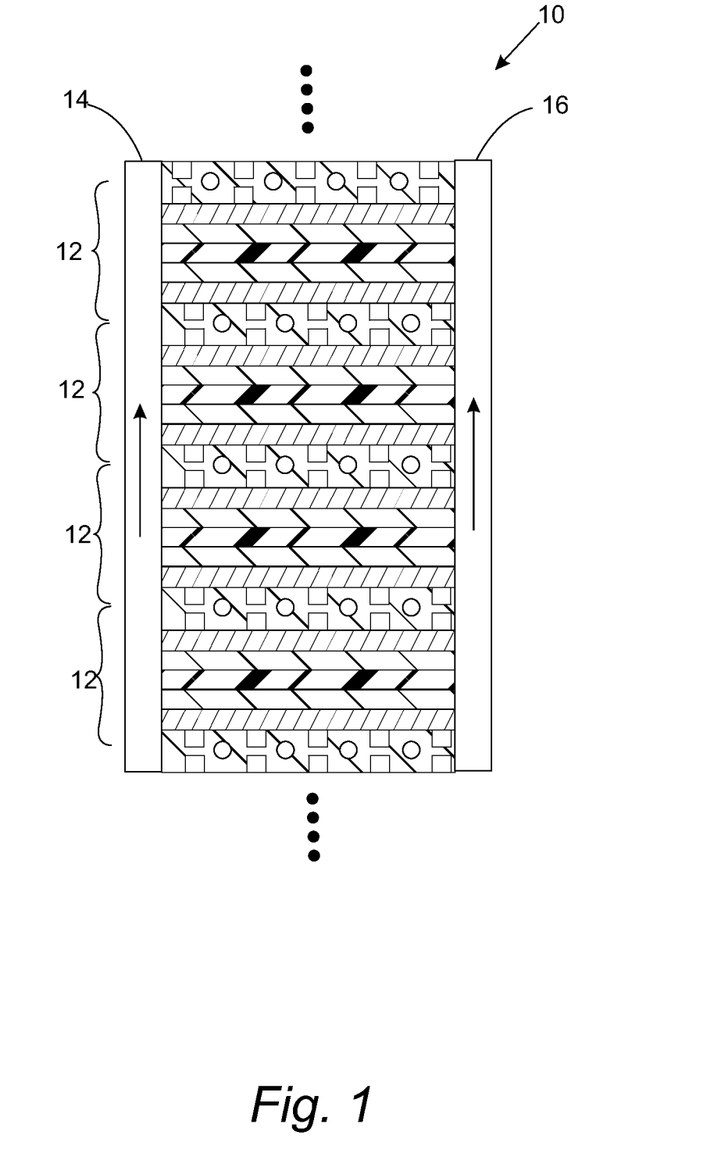
FIG. 1 provides a schematic cross-section of a fuel cell stack using multilayer seals.
Figure 2:
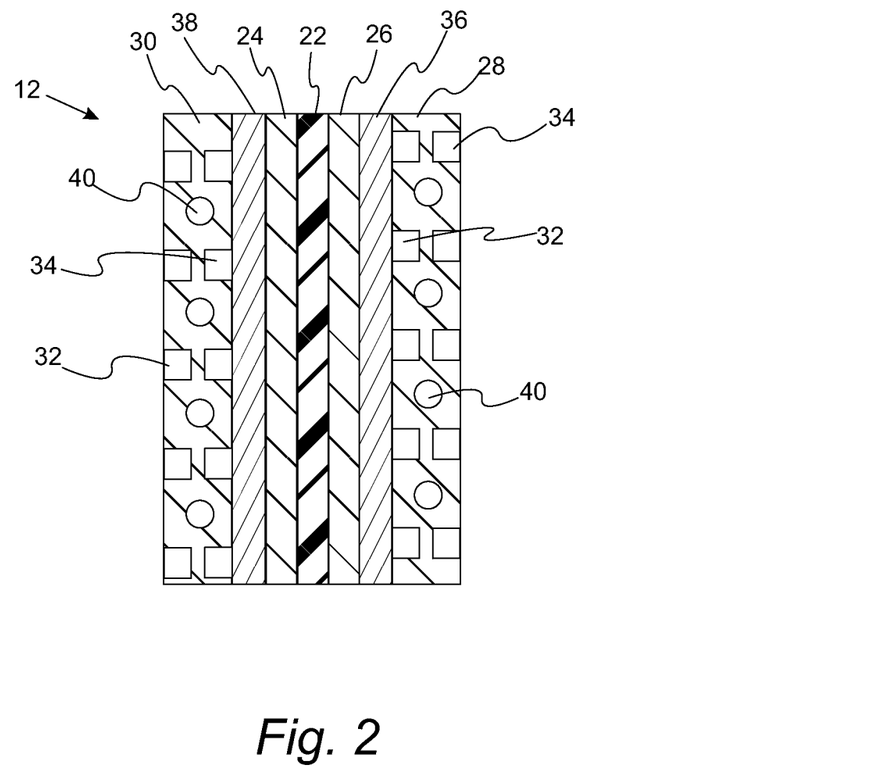
FIG. 2 provides a schematic cross-section of a fuel cell.

With reference to FIGS. 1 and 2, schematics of a fuel cell and fuel cell stack incorporating a multilayer seal are provided. FIG. 1 is a schematic cross section of a fuel cell stack. FIG. 2 is a schematic cross section of a fuel cell that incorporates multilayer seals. Fuel cell stack 10 includes a plurality of proton exchange membrane (PEM) fuel cells 12. Typically, a fuel cell stack may include 10 to 30 or more individual fuel cells. Fuel gases (e.g., hydrogen gas), oxygen-containing gas (e.g., air, $O_2$, etc.), and coolant (e.g., water) are provided at header sections 14 and 16. Fuel cell 12 includes polymeric ion conducting membrane 22 disposed between cathode catalyst layer 24 and anode catalyst layer 26. Fuel cell 12 also includes flow fields 28, 30, gas channels 32 and 34, and gas diffusion layers 36 and 38. In a refinement, flow fields 28, 30 are bipolar plates each having an anode side and a cathode side. In particular, flow fields 28, 30 are formed by combining an anode flow field plate and a cathode flow field plate. Coolant is supplied through cooling channels 40. During operation of the fuel cell, a fuel such as hydrogen is fed to the flow field plate 28 on the anode side and an oxidant such as oxygen is fed to flow field plate 30 on the cathode side. Hydrogen ions generated by anode catalyst layer 26 migrate through polymeric ion conducting membrane 22 where they react at cathode catalyst layer 24 to form water. This electrochemical process generates an electric current through a load connect to flow field plates 28 and 30.

Figure 3:
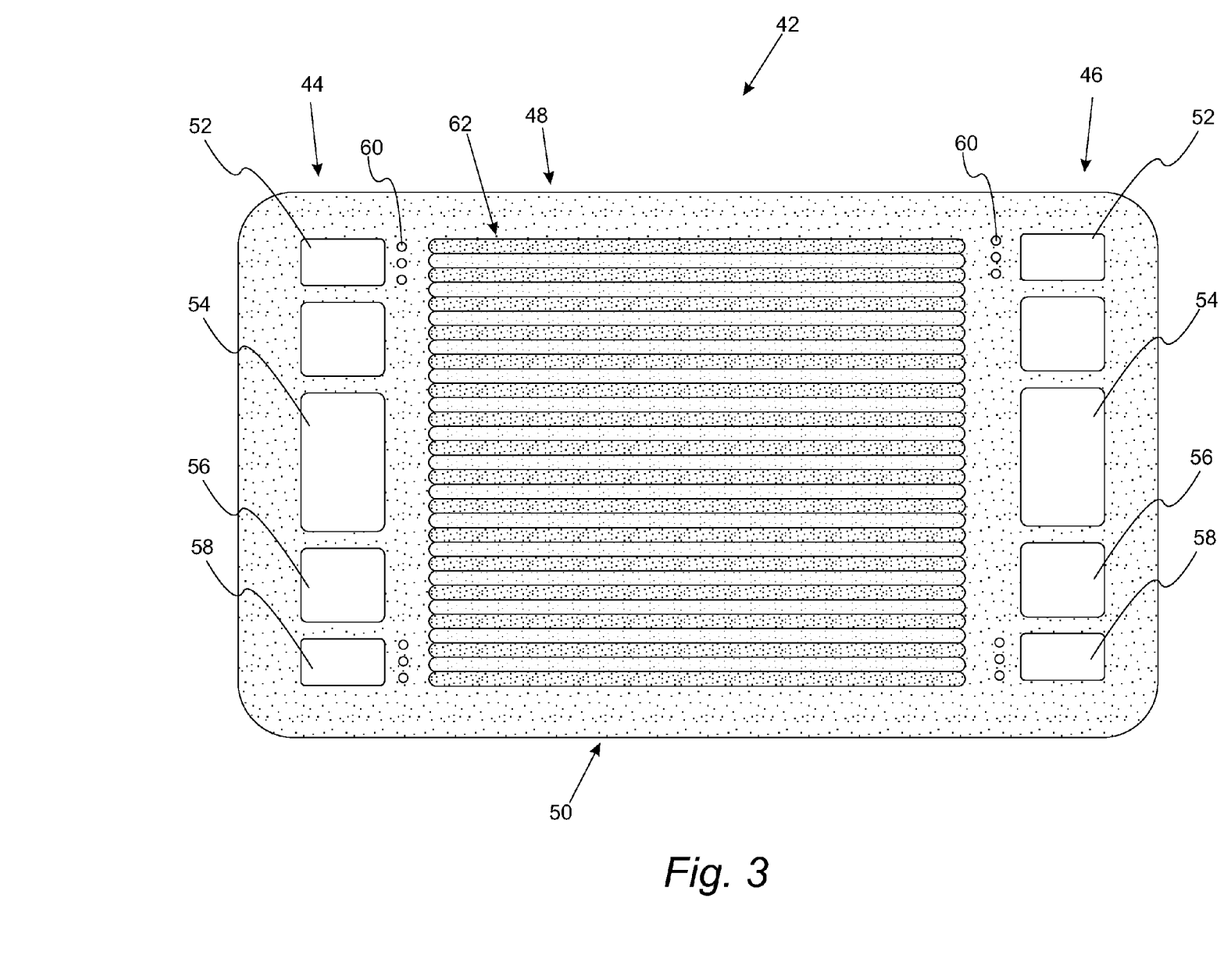
FIG. 3 provides a top view of a flow field plate.

Sealing along the edges of the individual fuel cells is an important consideration for ensuring proper functioning and durability. In a refinement of the invention, there is an edge seal between bipolar plates. In other refinements, bipolar plates are formed by combining two plates (e.g., a cathode plate and an anode plate) of the general design depicted in FIG. 3. In such situations, an edge seal is used to seal the two plates. In this regard, plate 42 includes header sections 44, 46, sides sections 48, 50, and details that should be sealed around. Such details include openings 52, 54, 56, 58 in the header section which are used to provide reactant gases and coolant to each fuel cell in a fuel cell stack. Additional details such as openings 60 are used to provide flow from one side of plate 42 to the other side. In a variation, flow field plate 42 includes corrugations 62 that form channels when combined with a second flow field plate of similar design. The edge sealing as set forth below advantageously avoids obstructing these openings.

With reference to FIGS. 4A-E, schematic illustrations of a multilayer edge seal for fuel cell applications are provided.

Figure 4A:
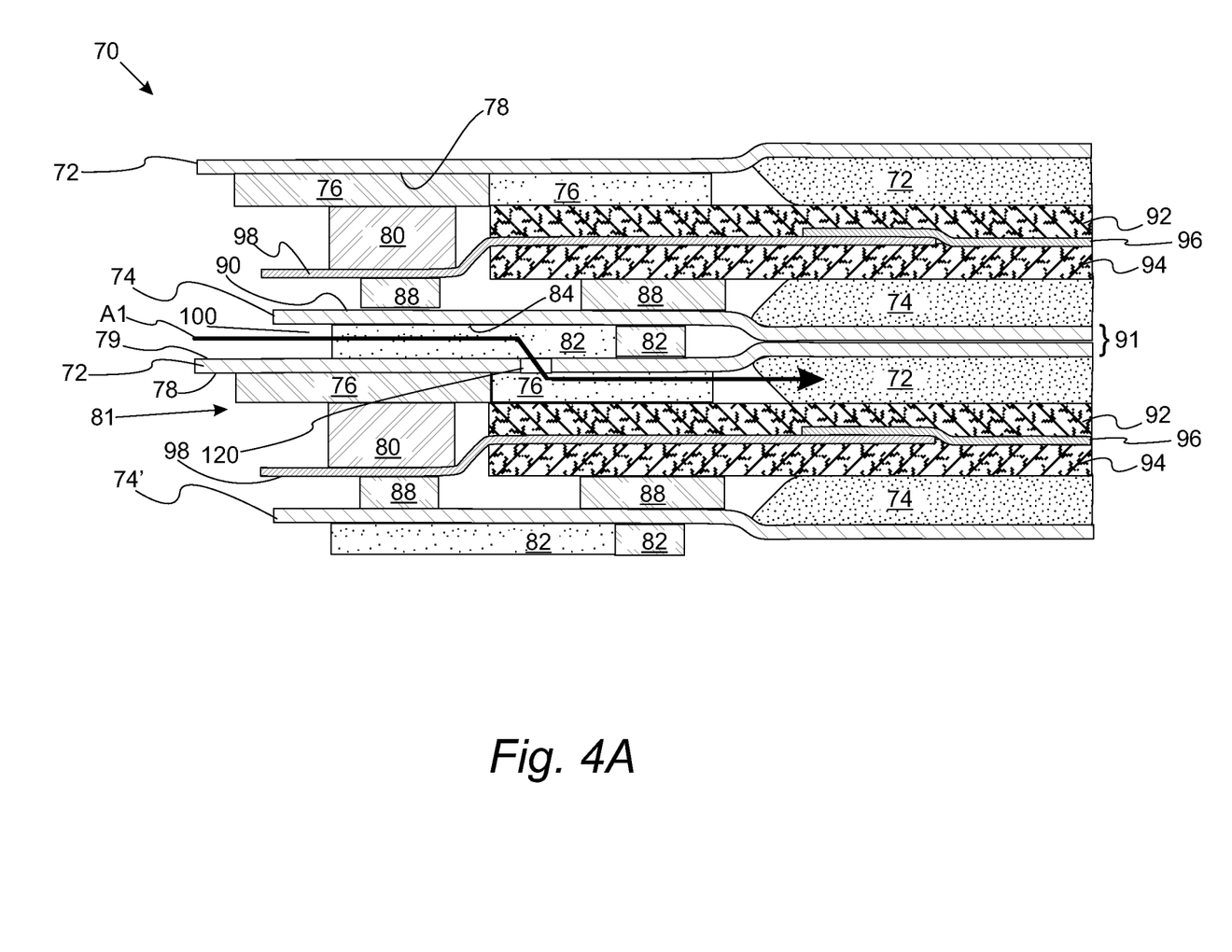
FIG. 4A provides a partial cross-section showing cathode flow tunnels partially defined by a patterned multilayer seal.
Figure 4B:
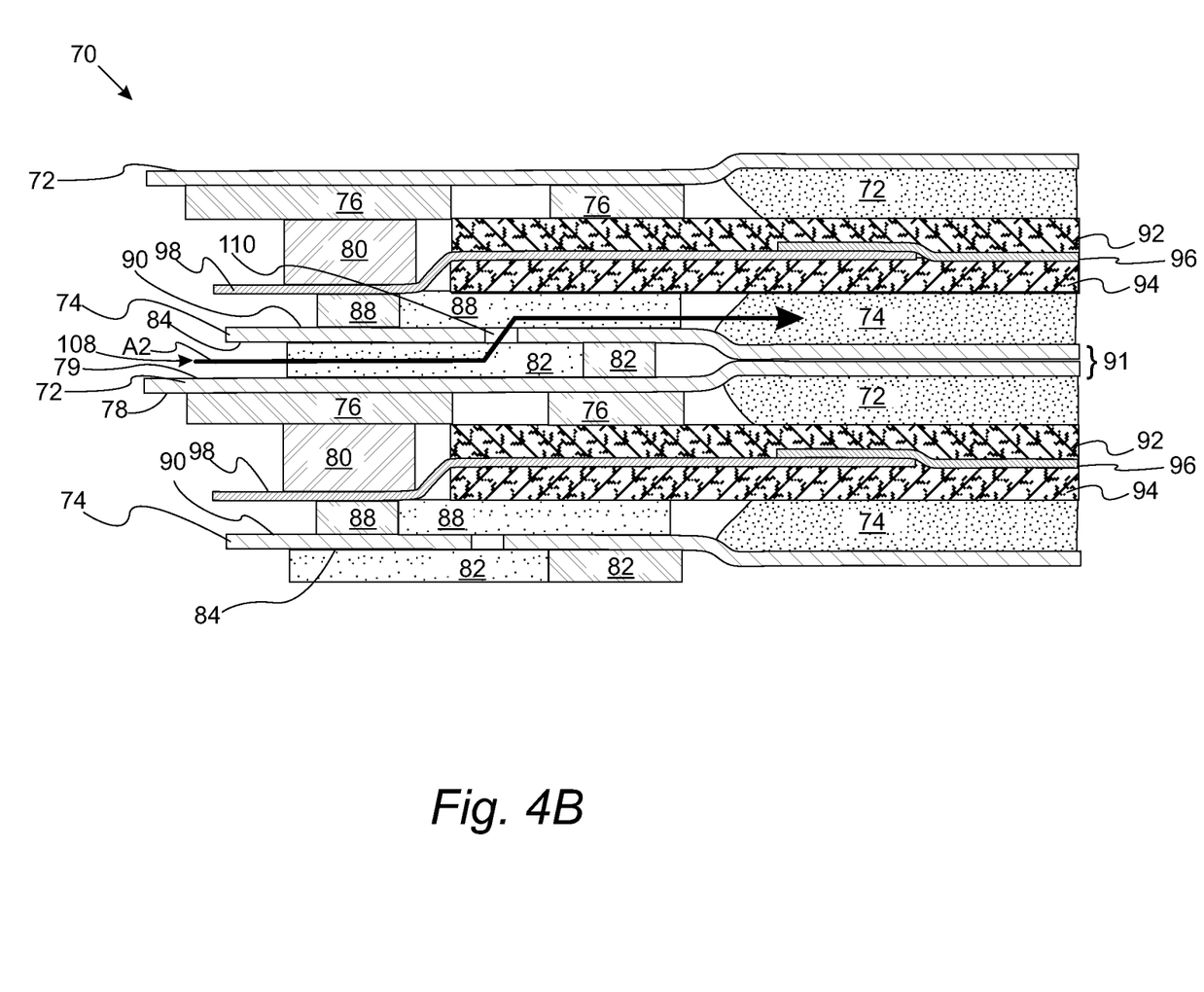
FIG. 4B provides a partial cross-section showing anode flow tunnels partially defined by a patterned multilayer seal.
Figure 4C:
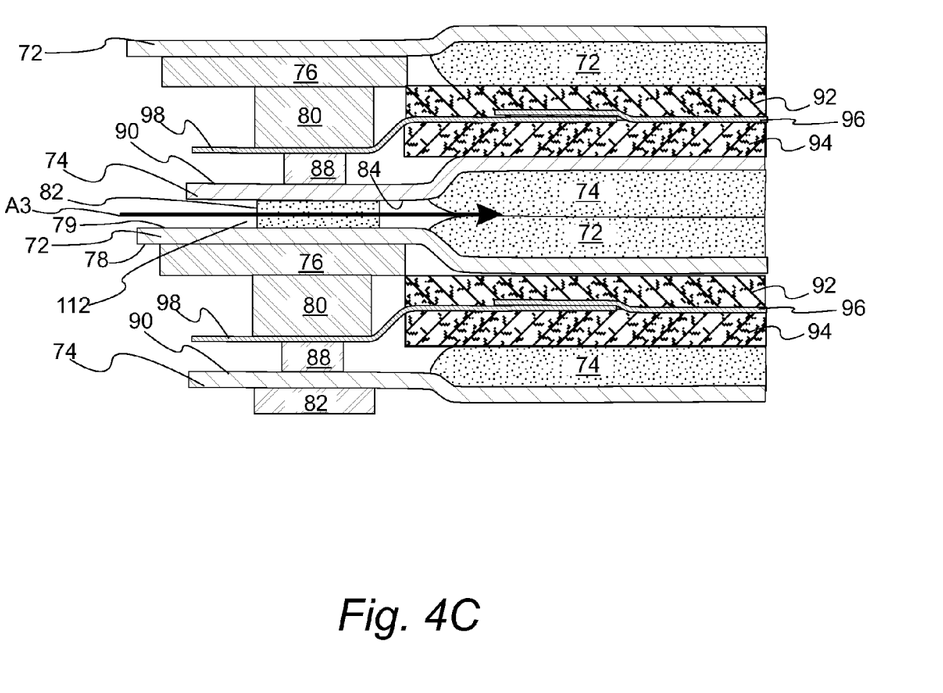
FIG. 4C provides a partial cross-section showing cooling tunnels partially defined by a patterned multilayer seal.
Figure 4D:
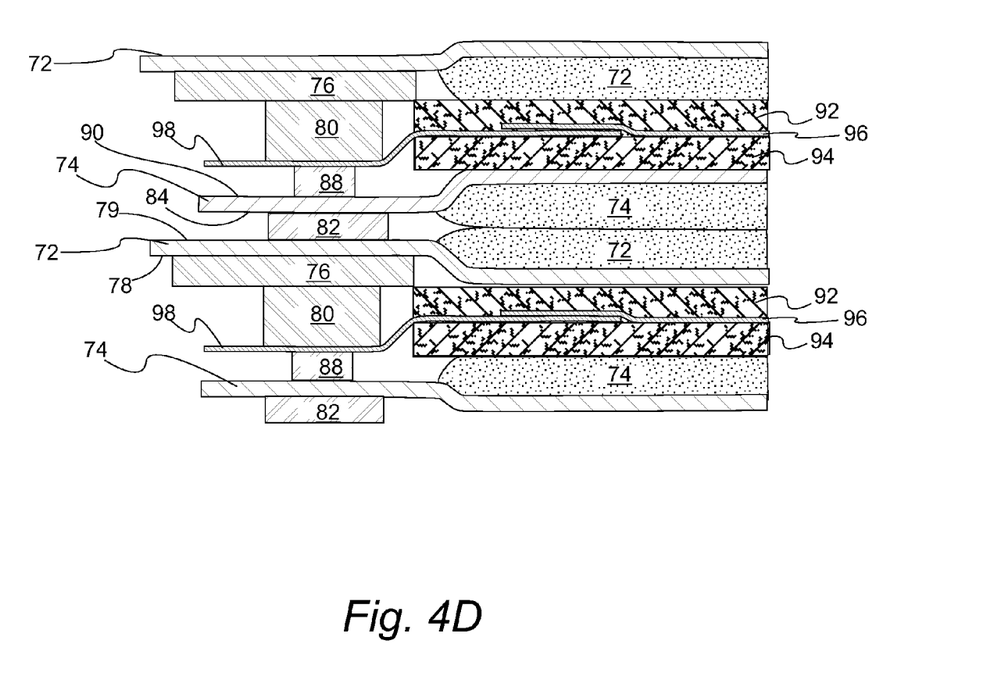
FIG. 4D provides a partial cross-section showing edge section partially defined by a patterned multilayer seal.
Figure 4E:
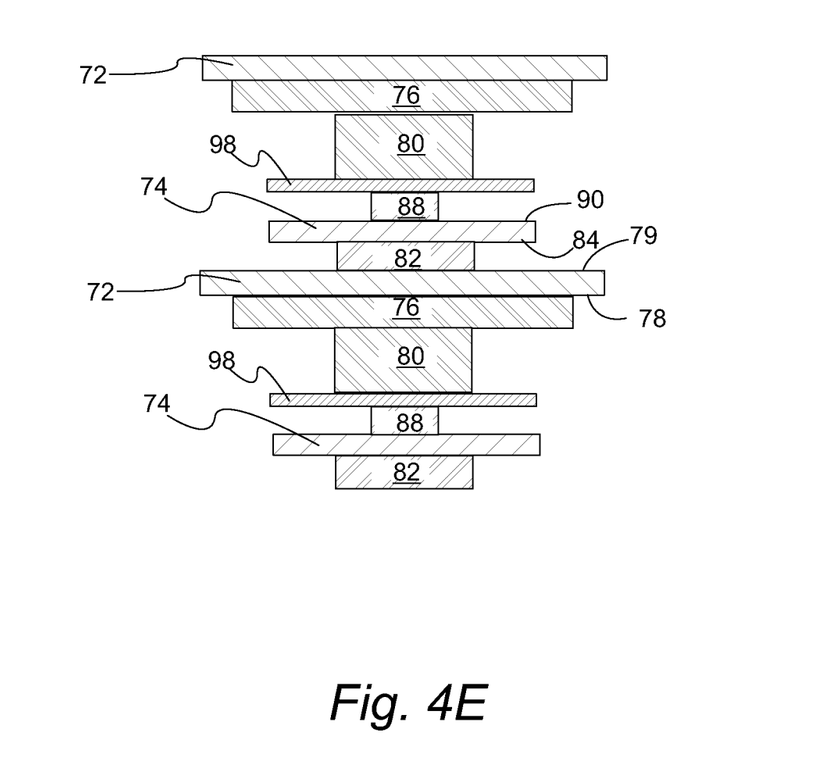
FIG. 4E provides a partial cross-section showing header sections partially defined by a patterned multilayer seal.

In general, a double layered seal is applied to one side of a first flow field plate while a single sealing layer is applied to both sides of a second flow field plate. In each case, the sealing layers avoid obstructing the details set forth above as well as the active fuel cell components. Moreover, the seal levels partially form conduits for directing the reactants and coolant. FIG. 4A provides a partial cross-section showing cathode flow channels partially defined by a patterned multilayer seal. FIG. 4B provides another partial cross-section showing flow channels defined by a patterned multilayer seal. FIG. 4C provides a partial cross-section showing cooling channels partially defined by a patterned multilayer seal. FIG. 4D provides a partial cross-section showing edge section partially defined by a patterned multilayer seal. FIG. 4E provides a partial cross-section showing header sections partially defined by a patterned multilayer seal. Each of the sealing sections depicted in FIGS. 4A-E includes first flow field plate 72 and second flow field plate 74. In one refinement, first flow field plate 72 is a cathode flow field plate and second flow field plate 74 is an anode flow field plate. In another refinement, first flow field plate 72 is an anode flow field plate and second flow field plate 74 is a cathode flow field plate.

Still referring to FIGS. 4A-E, first sealing layer 76 defines a first pattern and is disposed over first side 78 of first flow field plate 72. Second sealing layer 80 is disposed over first sealing layer 76 to form a multilayer seal 81. Second sealing layer 80 defines a second pattern. Third sealing layer 82 is disposed over first side 84 of second flow field plate 74. Third sealing layer 82 has a third predetermined sealing layer thickness. Fourth sealing layer 88 is disposed over a second side 90 of the second flow field plate 74. Fourth sealing layer 88 defines a fourth pattern and has a fourth predetermined sealing layer thickness. First flow field plate 72 is combined with an adjacent second flow field plate 74 to form a bipolar plate 91. In another variation, fuel cell components, such as diffusion media 92 and 94 and membrane electrode assembly 96, are interposed between first flow field plate 72 and another adjacent second flow field plate 74' to form a fuel cell. As set forth above, membrane electrode assembly 96 is interposed between diffusion media 92 and 94. In this regard, multilayer seal 81 and the fourth sealing layer 88 form an edge seal around a periphery of the membrane electrode assembly with an optional sub-gasket 98 interposed between the multilayer seal 81 and the fourth sealing layer 88. Sub-gasket 98 also overlaps with membrane electrode assembly 96 in forming such an edge seal.

As depicted in FIG. 4A, third sealing layer 82, first sealing layer 76, and first flow field plate 72 at least partially define flow channels 100 (i.e., a tunnel for providing reactants to the fuel cell). In particular, channel 100 includes a tunnel section defined by third sealing layer 82, first side 84 of the second flow field plate 74 and second side 79 of the first flow field plate 72. Channel 100 also includes a channel section defined by first sealing layer 76 and first side 78 of the first flow field plate 72. As used herein, "a tunnel section" includes four sides defined by a combination of flow field plates and sealing layer, while "a channel section" includes a side that contacts a diffusion material. First flow field plate 72 defines opening 120 that connects the tunnel section and the channel section. Arrow A1 shows the path of reactant through channel 100.

As depicted in FIG. 4B, third sealing layer 82, fourth sealing layer 88, and second flow field plate 74 at least partially define flow channels 108 (i.e., a tunnel for providing reactants to the fuel cell). In particular, channel 108 includes a tunnel section defined by third sealing layer 82, first side 84 of the second flow field plate 74 and second side 79 of the first flow field plate 72. Channel 108 includes a channel section defined by third sealing layer 82 and second side 90 of the second flow field plate 74. Second flow field plate 74 defines opening 110 that connects the tunnel section and the channel section. Arrow A2 shows the path of reactant through channel 108.

As depicted in FIG. 4C, third sealing layer 82, cathode flow field plate 72, and second flow field plate 74 at least partially define cooling channels 112 (i.e., a tunnel for providing coolant to bipolar plates). In particular, channel 112 includes a tunnel section defined by third sealing layer 82, first side 84 of the second flow field plate 74, and second side 79 of the first flow field plate 72. Arrow A3 shows the path of coolant through channel 108.

Figure 5A:
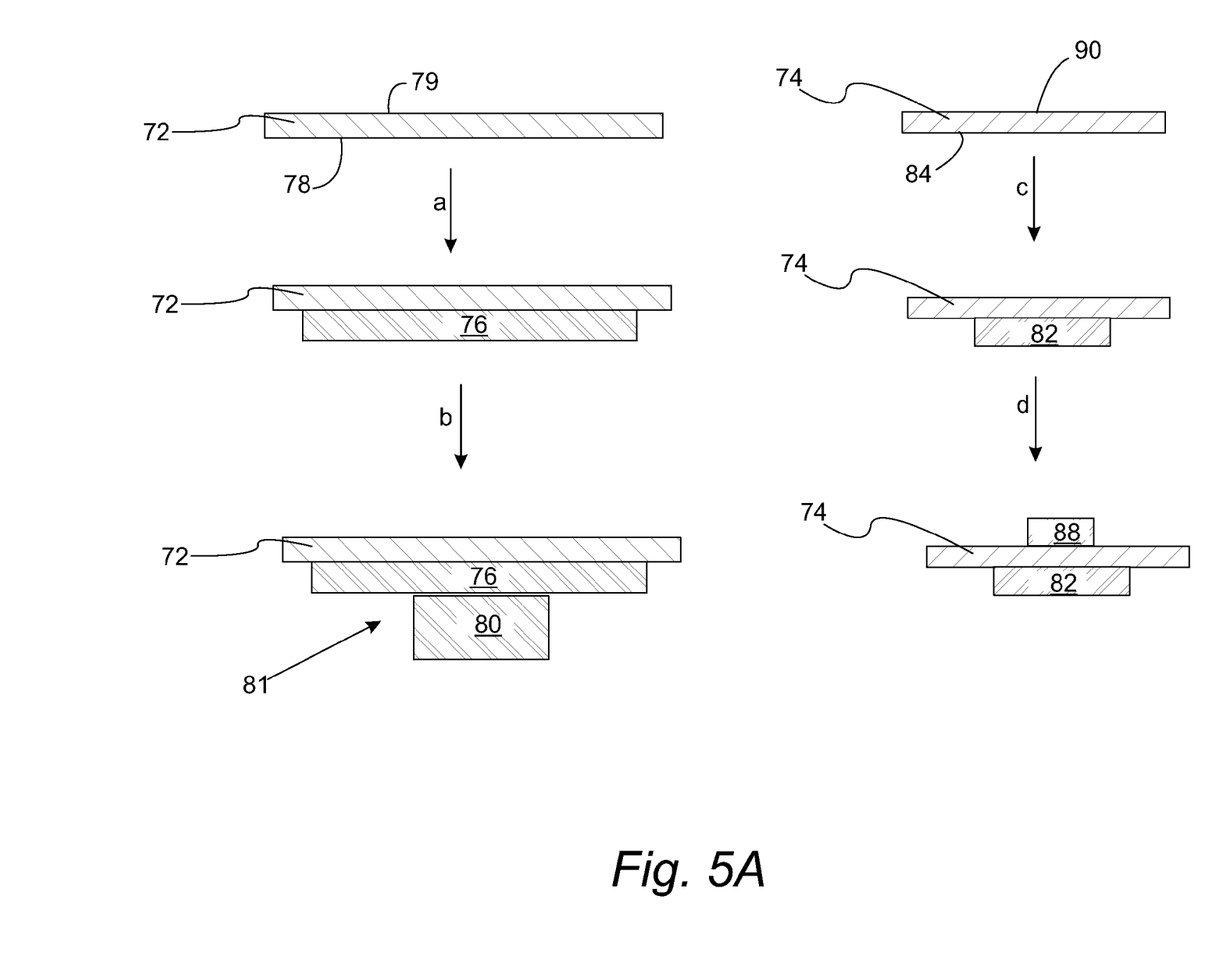
FIG. 5A is a flowchart depicting the formation of sealing layers on an anode flow field plate and a cathode flow field plate.
Figure 5B:
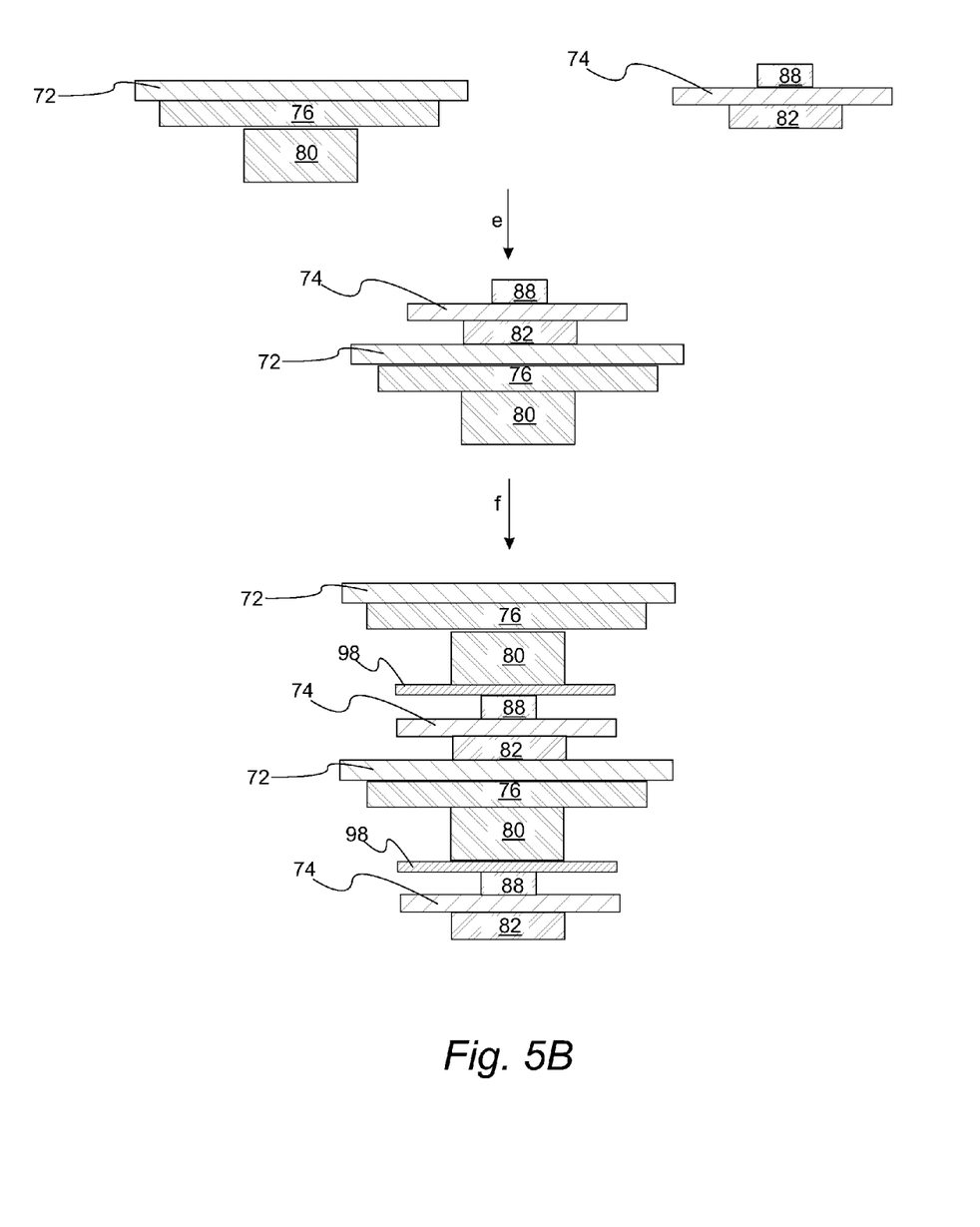
FIG. 5B is a flowchart depicting the formation of a bipolar plate using the coated anode flow field plate and a coated cathode flow field plate of FIG. 5A.
Figure 5C:
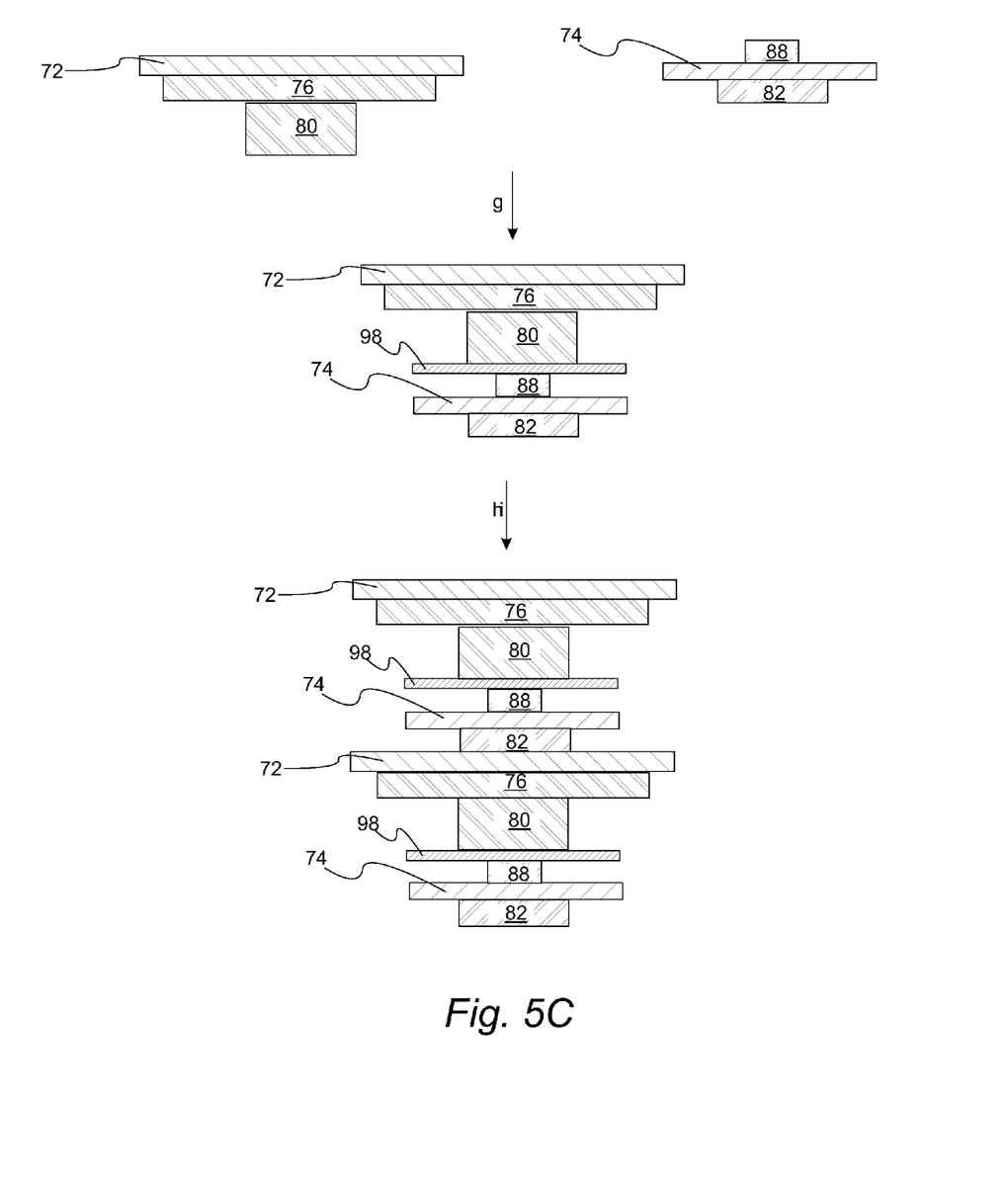
FIG. 5C is a flowchart depicting the formation of a fuel cell using the coated anode flow field plate and a coated cathode flow field plate of FIG. 5A.

With reference to FIGS. 5A-C, a method for forming a multilayer seal in a fuel cell and/or fuel cell stack as set forth above is provided. In step a), first sealing layer 76 is screen printed onto first flow field plate 72. First sealing layer 76 defines a first pattern and has a first predetermined sealing layer thickness. In a variation, first sealing layer 76 is formed by providing a first screen having a first resinous masking material disposed thereon in a first masking pattern. The first resinous masking material blocks flow through the first screen. The first resinous masking material extends (i.e., protrudes from) a first predetermined masking layer thickness from the first screen. The first screen is positioned proximate to a first side 78 of first flow field plate 72. A first curable seal composition is applied to the first screen such that the first curable seal composition flows through the screen at locations not blocked by the first resinous masking material and onto first flow field plate 72. The first curable seal composition is at least partially cured or fully cured to form first sealing layer 76. Such curing may be accomplished by heat curing, UV curing, moisture curing, and room temperature curing using two part systems mixed at the time of application. Partially cured variations can be taken to full cure in a later step. Moreover, different cure mechanisms can be used for the partial and full cure steps. In step b), multilayer seal 81 is formed by screen printing second sealing layer 80 over first sealing layer 76. Second sealing layer 80 defines a second pattern and has a second predetermined sealing layer thickness. In a variation, second sealing layer 80 is formed by providing a second screen having a second resinous masking material disposed thereon in a second masking pattern. The second resinous masking material blocks flow through the second screen. The second resinous masking material extends a second predetermined masking layer thickness from the second screen. The second screen is positioned proximate to first sealing layer 76. A second curable seal composition is applied to the second screen such that the second curable seal composition flows through the second screen at locations not blocked by the second resinous masking material and onto first sealing layer 76. Screen printed multilayer seal 81 is formed by at least partially curing or fully curing the second curable seal composition to form second sealing layer 80. Such curing may be accomplished by heat curing, UV curing, moisture curing, and room temperature curing using two part systems mixed at the time of application. Partially cured variations can be taken to full cure in a later step. Moreover, different cure mechanisms can be used for the partial and full cure steps. Multilayer seal 81 includes first sealing layer 76 and second sealing layer 80. Second sealing layer 80 defines a second seal pattern that overlays at least a portion of the first sealing layer 76. In a refinement, the first predetermined masking layer thickness and the second predetermined masking layer thickness are each independently from 100 to 700 microns. Typically, the first resinous masking material and the second resinous masking material each independently include a cured emulsion polymer.

In step c), third sealing layer 82 is screen printed over first side 84 of second flow field plate 74. Third sealing layer 82 has a third predetermined sealing layer thickness. In a variation, third sealing layer 82 is formed by providing a third screen having a third resinous masking material disposed thereon in a third pattern. The third resinous masking material blocks flow through the third screen and extends a third predetermined masking layer thickness from the third screen. The third screen is positioned proximate to first side 84 of second flow field plate 74. The third curable seal composition is applied to the third screen such that the third curable seal composition flows through the third screen at locations not blocked by the third resinous masking material and onto first side 84 of second flow field plate 74. The third curable seal composition is at least partially cured or fully cured to form third sealing layer 82. Such curing may be accomplished by heat curing, UV curing, moisture curing, and room temperature curing using two part systems mixed at the time of application. Partially cured variations can be taken to full cure in a later step. Moreover, different cure mechanisms can be used for the partial and full cure steps. In a refinement, the third predetermined masking layer thickness is from 100 to 700 microns. Typically, the third resinous masking material includes a cured emulsion polymer.

In step d), fourth sealing layer 88 is screen printed over second side 90 of second flow field plate 74. Fourth sealing layer 88 has a fourth predetermined sealing layer thickness. In a variation, fourth sealing layer 88 is formed by providing a fourth screen having a fourth resinous masking material disposed thereon in a fourth pattern. The fourth pattern resinous masking material blocks flow through the fourth screen. The fourth resinous masking material extends a fourth predetermined masking layer thickness from the fourth screen. The fourth screen is positioned proximate to second side 90 of second flow field plate 74. A fourth curable seal composition is applied to the fourth screen such that the fourth curable seal composition flows through the fourth screen at locations not blocked by the fourth resinous masking material and onto second side 90 of second flow field plate 74. The fourth curable seal composition is at least partially cured or fully cured to form fourth sealing layer 88 with the fourth sealing layer defining a fourth seal pattern. Such curing may be accomplished by heat curing, UV curing, moisture curing, and room temperature curing using two part systems mixed at the time of application. Partially cured variations can be taken to full cure in a later step. Moreover, different cure mechanisms can be used for the partial and full cure steps. In a refinement, the fourth predetermined masking layer thickness is from 100 to 700 microns. Typically, the fourth resinous masking material includes a cured emulsion polymer.

With reference to FIG. 5B, first flow field plate 72 and second flow field plate 74 are combined to form a bipolar flow field plate assembly in step e) where the third sealing layer 82 is positioned adjacent to second side 79 of the first flow field plate. Characteristically, the multilayer seal and the third sealing layer define flow channels for guiding reactants to fuel cell catalyst layers. In a refinement, the steps a) to e) are repeated a plurality of times to form a plurality of bipolar flow field assemblies that are integrated into a fuel cell stack as depicted in FIG. 1. In a refinement, a first bipolar flow field assembly and a second bipolar flow field assembly (each formed by steps a) to e)) are combined with a fuel cell membrane electrode assembly and a pair of gas diffusion layers interposed between the first bipolar flow field assembly and the second bipolar flow field assembly. In particular, the bipolar plate is integrated into a fuel cell stack as depicted by step f).

With reference to FIG. 5C, first flow field plate 72 and second flow field plate 74 are combined to form a fuel cell in step g). In a refinement, the steps a) to e) are repeated a plurality of times to form a plurality of fuel cells. In a variation, the fuel cell is integrated into a fuel cell stack as depicted by step h).

In a variation, the first predetermined sealing layer thickness, the second predetermined sealing layer thickness, the third predetermined sealing layer thickness, and the fourth predetermined sealing layer thickness are each independently from 100 to 700 microns. In a refinement, the first predetermined sealing layer thickness, the third predetermined sealing layer thickness, and the fourth predetermined sealing layer thickness are each independently from 100 to 200 microns and the second predetermined sealing layer thickness is from 200 to 400 microns.

Typically, the first sealing layer, the second sealing layer, the third sealing layer and the fourth sealing layer each independently include a cured resin and an optional thickening or thinning agent. Examples of suitable cured resin include, but are not limited to, silicone rubbers, urethanes, ethylene propylene diene monomer rubbers, and combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising;
    a) screen printing a first sealing layer on a first flow field plate, the first sealing layer defining a first pattern and having a first predetermined sealing layer thickness;
    b) forming a multilayer seal by screen printing a second sealing layer over the first sealing layer, the second sealing layer defining a second pattern and having a second predetermined sealing layer thickness;
    c) screen printing a third sealing layer over a first side of a second flow field plate having a third predetermined sealing layer thickness;
    d) screen printing a fourth sealing layer over a second side of the second flow field plate having a fourth predetermined sealing layer thickness; and
    e) combining the first flow field plate and the second flow field plate to form flow channels for guiding reactants to a fuel cell catalyst layer, wherein one of the first flow field plate and the second flow field plate is an anode flow field plate and one of one of the first flow field plate and the second flow field plate is a cathode flow field plate, wherein the first sealing layer is formed by:
    providing a first screen having a first resinous masking material disposed thereon in a first masking pattern, the first resinous masking material blocking flow through the first screen, the first resinous masking material extending a first predetermined masking layer thickness from the first screen; and applying a first curable seal composition to the first screen such that the first curable seal composition flows through the screen at locations not blocked by the first resinous masking material and onto the first flow field plate; and at least partially curing the first curable seal composition to form the first sealing layer; and wherein the second sealing layer is formed by:

providing a second screen having a second resinous masking material disposed thereon in a second masking pattern, the second resinous masking material blocking flow through the second screen, the second resinous masking material extending a second predetermined masking layer thickness from the second screen;

applying a second curable seal composition to the second screen such that the second curable seal composition flows through the second screen at locations not blocked by the second resinous masking material and onto the first sealing layer; and at least partially curing the second curable seal composition to form the second sealing layer.

2. The method of claim 1 further comprising repeating steps a) to e) form a plurality of bipolar flow field assemblies.

3. The method of claim 1 wherein the first flow field plate and the second flow field plate are combined to form a bipolar flow field plate assembly, the third sealing layer positioned adjacent to a second side of the first flow field plate, the multilayer seal and the third sealing layer defining flow channels for guiding reactants to a fuel cell catalyst layers.

4. The method of claim 1 wherein a first bipolar flow field assembly is combined with a second bipolar flow field assembly with a fuel cell membrane electrode assembly and a pair of gas diffusion layers interposed between the first bipolar flow field assembly and the second bipolar flow field assembly, the first bipolar flow field assembly and the second bipolar flow field assembly each formed by steps a) to e).

5. The method of claim 4 wherein the multilayer seal and the fourth sealing layer form an edge seal around a periphery of the fuel cell membrane electrode assembly with an optional sub-gasket interposed between the multilayer seal and the fourth sealing layer.

6. The method of claim 1 wherein the first predetermined sealing layer thickness, the second predetermined sealing layer thickness, the third predetermined sealing layer thickness, and the fourth predetermined sealing layer thickness are each independently from 100 to 700 microns.

7. The method of claim 1 wherein the first sealing layer, the second sealing layer, the third sealing layer and the fourth sealing layer each independently include a cured resin and an optional thickening agent.

8. The method of claim 7 wherein the cured resin is selected from the group consisting of silicone rubbers, urethanes, ethylene propylene diene monomer rubbers, and combinations thereof.

9. The method of claim 1 wherein the first flow field plate is a cathode flow field plate and the second flow field plate is an anode flow field plate.

10. The method of claim 1 wherein the flow channels include at least one channel having a tunnel portion at least partially defined by the third sealing layer, the first side of the second flow field plate, and the second side of the first flow field plate.

11. The method of claim 10 wherein the at least one channel further includes a channel portion at least partially defined by the first sealing layer and the first side of the first flow field plate, the first flow field plate defining an opening connecting the tunnel portion and the channel portion.

12. The method of claim 1 wherein the first predetermined masking layer thickness and the second predetermined masking layer thickness are each independently from 100 to 700 microns.

13. The method of claim 12 wherein the first resinous masking material and the second resinous masking material each independently include a cured emulsion polymer.

14. A method comprising
a) providing a first screen having a first resinous masking material disposed thereon in a first pattern, the first resinous masking material blocking flow through the first screen, the first resinous masking material extending a first predetermined masking layer thickness from the first screen;
b) providing a second screen having a second resinous masking material disposed thereon in a second pattern, the second resinous masking material blocking flow through the second screen, the second resinous masking material extending a second predetermined masking layer thickness from the second screen;
c) positioning the first screen proximate to a first side of a first flow field plate;
d) applying a first curable seal composition to the first screen such that the first curable seal composition flows through the first screen at locations not blocked by the first resinous masking material and onto the first flow field plate;
e) at least partially curing the first curable seal composition to form a first sealing layer, the first sealing layer defining a first seal pattern;
f) positioning the second screen proximate to the first sealing layer;
g) applying a second curable seal composition to the second screen such that the second curable seal composition flows through the second screen at locations not blocked by the second resinous masking material and onto the first sealing layer;
h) forming a screen printed multilayer seal by at least partially curing the second curable seal composition to form a second sealing layer, the multilayer seal including the first sealing layer and the second sealing layer, the second sealing layer defining a second seal pattern that overlays at least a portion of the first sealing layer;
i) providing a second flow field plate having a third sealing layer disposed on a first side of the second flow field plate and a fourth sealing layer disposed on a second side of the second flow field plate; and
j) combining the first flow field plate and the second flow field plate to form flow channels for guiding reactants to a fuel cell catalyst layer, wherein one of the first flow field plate and the second flow field plate is an anode flow field plate and one of one of the first flow field plate and the second flow field plate is a cathode flow field plate.

15. The method of claim 14 wherein the third sealing layer is formed by:
providing a third screen having a third resinous masking material disposed thereon in a third pattern, the third resinous masking material blocking flow through the third screen, the third resinous masking material extending a third predetermined masking layer thickness from the third screen;
positioning the third screen proximate to the first side of the second flow field plate;

applying a third curable seal composition to the third screen such that the third curable seal composition flows through the third screen at locations not blocked by the third resinous masking material and onto the first side of the second flow field plate;

at least partially curing the third curable seal composition to form the third sealing layer, the third sealing layer defining a third seal pattern; and wherein the fourth sealing layer is formed by:

providing a fourth screen having a fourth resinous masking material disposed thereon in a fourth pattern, the fourth resinous masking material blocking through the fourth screen, the fourth resinous masking material extending a fourth predetermined masking layer thickness from the fourth screen;

positioning the fourth screen proximate to the second side of the second flow field plate;

applying a fourth curable seal composition to the fourth screen such that the fourth curable seal composition flows through the fourth screen at locations not blocked by the fourth resinous masking material and onto the second side of the second flow field plate; and at least partially curing the fourth curable seal composition to form a fourth sealing layer, the fourth sealing layer defining a fourth seal pattern.

16. The method of claim 14 wherein a first bipolar flow field assembly is combined with a second bipolar flow field assembly with a fuel cell membrane electrode assembly interposed between the first bipolar flow field assembly and the second bipolar flow field assembly, the first bipolar flow field assembly and the second bipolar flow field assembly each formed by steps a) to j).

17. The method of claim 14 wherein the flow channels include at least one channel having:

a tunnel portion defined by third sealing layer, the first side of the second flow field plate, and the second side of the first flow field plate; and a a channel portion at least partially defined by the first sealing layer and the first side of the first flow field plate, the first flow field plate defining an opening connecting the tunnel portion and the channel portion.

18. The method of claim 14 wherein the first predetermined masking layer thickness and the second predetermined masking layer thickness are each independently from 100 to 700 microns.

19. The method of claim 14 wherein the first resinous masking material and the second resinous masking material each independently include a cured emulsion polymer.

* * * * *